US005974568A

United States Patent [19]

McQueen

[11] Patent Number: 5,974,568

[45] **Date of Patent: *Oct. 26, 1999**

[54] HIERARCHICAL ERROR REPORTING SYSTEM

[75] Inventor: Stan McQueen, Colorado Springs, Colo.

[73] Assignee: MCI Communications Corporation, Washington, D.C.

[ * ] Notice: This patent issued on a continued prosecution application filed under 37 CFR 1.53(d), and is subject to the twenty year patent term provisions of 35 U.S.C. 154(a)(2).

[21] Appl. No.: 08/560,426

[22] Filed: Nov. 17, 1995

[51] Int. Cl.[6] .......... G06F 11/00

[52] U.S. Cl. .......... 714/38; 714/48; 395/701; 395/704; 364/267.91

[58] Field of Search .......... 395/183.14, 183.15, 395/184.01, 185.01, 185.02, 601, 704, 705, 708; 364/232.3, 254.5, 267, 267.91, 275.5; 714/38, 39, 47, 48, 49

[56] References Cited

U.S. PATENT DOCUMENTS

| | | | |
|---|---|---|---|
| 4,481,577 | 11/1984 | Forson | 395/601 |
| 4,679,195 | 7/1987 | Dewey | 395/183.1 |
| 5,047,977 | 9/1991 | Hill et al. | 395/185.1 |
| 5,383,201 | 1/1995 | Satterlee et al. | 395/182.02 |
| 5,404,503 | 4/1995 | Hill et al. | 395/183.07 |
| 5,432,795 | 7/1995 | Robinson | 395/704 |
| 5,450,575 | 9/1995 | Sites | 395/707 |
| 5,561,763 | 10/1996 | Eto et al. | 395/183.11 |
| 5,598,560 | 1/1997 | Benson | 395/707 |
| 5,701,587 | 12/1997 | Arbouzov | 395/704 |
| 5,712,972 | 1/1998 | Kakkar | 395/183.02 |

OTHER PUBLICATIONS

Richard W. Selby "Generating Hierarchical System Descriptions for Software Error Localization" IEEE Paper, 1988 pp. 89–93.

Chang Yeol Lee et al.; An Implementation of a Window–Based Debugging Tool for Kyoto Common Lip; Conference Date Nov. 14–15, 1990 pp. 834–838.

Yau, S.S. et al. "An Approach to Real–Time Control Flow Check" IEEE pp. 163–167; 1978.

Burnell; L.J. et al.; "A Synthesis of Logical and Probabilistic Reasoning for Program Understanding & Debugging"; Morgan Kaufman Publishers; pp. 285–291; 1993.

News Release, Stratos Ware Corp, StratosWare Releases Mem Check for the Macintosh; Oct. 19, 1992, pp. 1–2.

Baker et al; Space–Filling Software Visualization; Journal of Visual Languages & Computing (Jun., 1995) vol. 6, No. 2, pp. 119–133.

Pallatlo; P.C. Week; SQL Solutions is Broadening Database Line With SQR 4GL; Nov. 26, 1990; V.7, N.47, p. (63)1.

News Release; SQL Solutions Inc., SQL Solutions Unvrils SQR—Developer's Kit; Nov. 5, 1990; pp. 1–2.

*Primary Examiner*—Dieu-Minh T. Le

[57] ABSTRACT

Error reporting may be enhanced, by utilizing a programming language, such as C++ and its attendant enhanced error reporting facility. The invention generates an error message at the function level where the error occurs, as well as noting the line of source code during which time the error occurred. The resulting populated error message is then rolled up toward the main program. At each preceding roll up level, an additional error message is populated which notes the original error message information as well as adding return path information. Thus, after completed roll up to the main program, stacked error messages are made available to the user that fully define the complete path involving the error, in addition to the identification of the source code line where the error occurred.

7 Claims, 5 Drawing Sheets

HIERARCHICAL ERROR REPORTING SYSTEM

FIELD OF THE INVENTION

The present invention relates to computer error reporting systems, and more particularly to such a system that tracks and reports the software path traversed by an error generated during the running of a software application.

BACKGROUND OF THE INVENTION

Error code generation is an important aspect of running computer software (hereinafter referred to as "applications"). Even operating systems generate error codes or phrases when an abnormality is detected during operation of the software. Typical error messages in applications may include a message indicating that a particular requested file has not been found. Similarly, in an operating system, error messages are presented to the user, such as in the instance where a command is entered by the user that is not recognized by the operating system.

A primary disadvantage of present error reporting systems, in applications and operating systems, is the lack of fully identifying where in the program (e.g., line of source code) the error was detected. This would enable programmers to review the source code and quickly concentrate on the cause of the error, based on its occurrence at a particular point in the program. Further, the same error code may be returned during various subroutines or functions, during an application, so that no unique correspondence between the error and the function/subroutine exists. This makes it more difficult to troubleshoot problems when running applications.

The problem becomes multiplied when a main program accomplishes its processing by relying upon modules, in the nature of functions and subroutines, that themselves rely upon a library of software services. By way of example, a software function may include an application command to retrieve a file. Services relate to underlying surfaces such as OLE which provides a software transport for importing data from one particular application, such as Excel™ into a second application, such as Word™. Since the same service may be employed by various functions and subroutines, the generation of a simple service error message is not terribly useful since it does not uniquely identify which branch of the application was involved.

Accordingly, a need exists to track and report errors with greater detail than that currently available.

BRIEF DESCRIPTION OF THE PRESENT INVENTION

The present invention anticipates the rewriting of existing applications, or the generation of new applications utilizing programming languages that permit the generation and relaying of detailed error messages (hereinafter referred to as "exceptions") that identify a line of source code where the error is generated, as well as the path traversed by the exception on a return of the resulting error message to a user's display.

This is accomplished by generating a message, upon the occurrence of an exception, the message being populated with fields that define where the error occurred. This message is then relayed (queued) through subsequent application functions as part of a return path to the main program and subsequently to the user's display. Once an error message is generated at one particular function layer, each subsequent functional layer affected generates its own message identifying the location of that subsequent function layer. The end result will be a stacking (attachment) of these error messages, relating to an exception detected along the return path to the main program.

In this manner, the return path is completely identified since path data has populated fields of respective error messages, created at each affected functional layer. Part of the information includes the line of source code affected when the error was detected.

This level of detail in error reporting is stored for troubleshooting. It is most helpful to detect whether the error occurred as a result of a "bug" in the program itself, or whether it was most probably introduced as a result of user error. Certainly, the generation of hierarchical error reporting is extremely useful during development of a software application.

BRIEF DESCRIPTION OF THE FIGURES

The above-mentioned objects and advantages of the present invention will be more clearly understood when considered in conjunction with the accompanying drawings, in which.

DETAILED DESCRIPTION OF THE INVENTION

Figure 1:
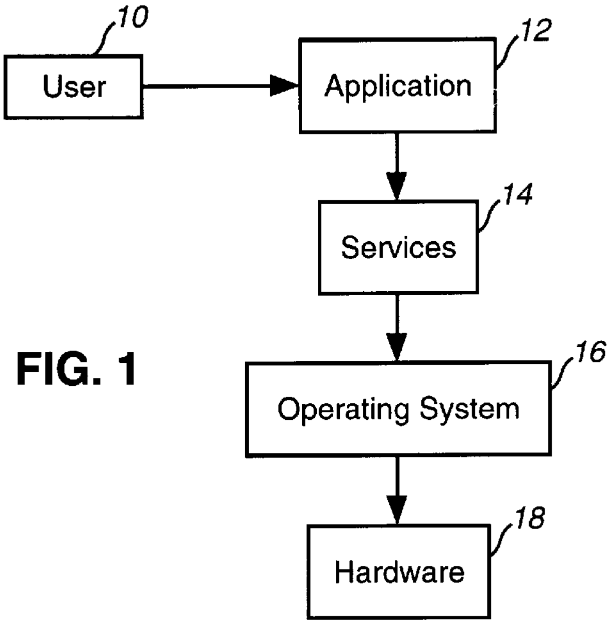
FIG. 1 is an architectural block diagram of a generalized computer system platform.

FIG. 1 is a generalized architecture of a personal computer (PC). A user 10 relies upon a software program or application 12 to process data (for example, in a word processing program such as Word™ by Microscoft). The PC system is controlled by an operating system 16, such as DOS™, Windows™, etc. The hardware of the computer 18 carries out the various processes required by the application and the operating system. Often times, an additional layer, indicated as services 14, interfaces with the application. For example, if data from the computer software Excel™, by Microscoft, is to be inserted into a document being prepared in Word™, an underlying service, such as the conventional service OLE may be required. Any of the boxes shown in FIG. 1 may generate an error. The purpose of the present invention is to report back, with detailed particularity to the user 10, an error report that identifies the path of the error as well as the line of source code where the error was encountered. Basically, in order to achieve this function, and as will be explained hereinafter in greater detail, this requires the generation of an error message in the layer where the error is introduced. Subsequently "touched" levels in the return path of the error, to the user, generate a separate error message identifying each respective layer in the return path. The end result is a stacking of error messages that completely defines the error and the return path of the error. The error messages created avoid the ambiguity that results from present error reporting systems where a similar error can occur in parallel branches so that a returned error does not fully identify the particular branch affected.

Figure 2:
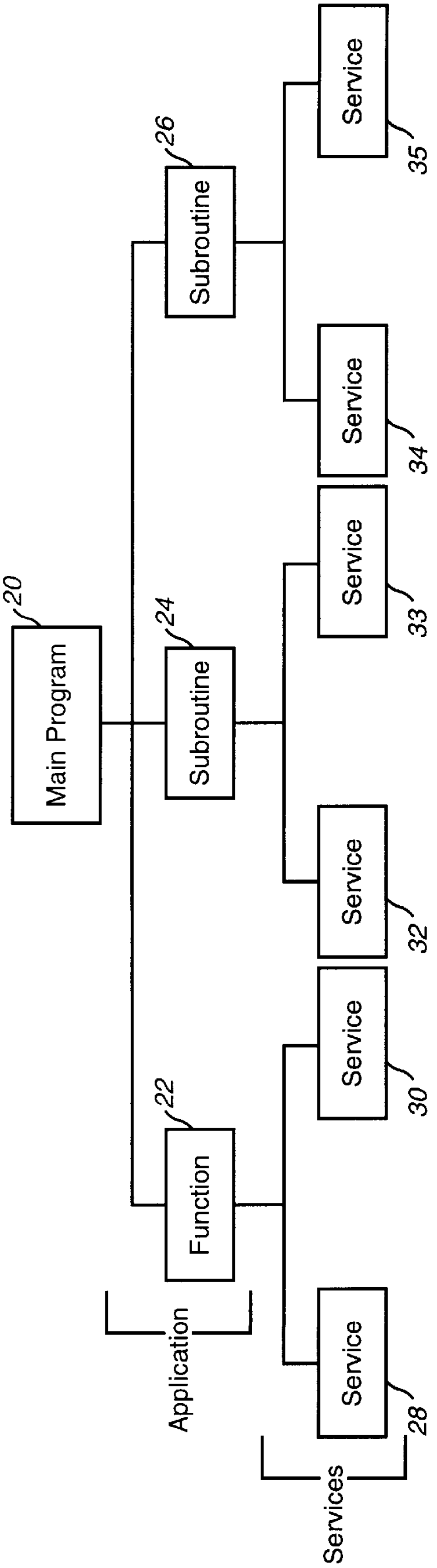
FIG. 2 is a hierarchical flowchart of a program indicating the two principal layers of application and underlying software layer, namely, services.

For example, in FIG. 2, the hierarchy for a prior art architecture involving a software application and attendant services is depicted. More particularly, a main program 20 controls subroutines 24 and 26. The main program also controls a function 22 which may be a simple command from the user 10, such as a retrieve file function, or similarly a read function of a database record. As the hierarchy diagram of FIG. 2 indicates, the function 22 and subroutines 24, 26 may each cooperate with various services 28–35. As a reminder, "services" is used in the context of an underlying software layer such as the case of OLE, as previously explained in connection with FIG. 1. Function 22 again refers to an application command, such as retrieve a file or read a database record. Typically, software applications include a library of functions, any of which may be the particular function indicated by block 22 in FIG. 2.

In order to understand the limitations of the prior art reporting systems, consider more than one of the services 28–35 as generating an error message. The error message is reported back through a respective preceding level (function 22, subroutines 24, 26) to the main program 20. The user is informed as to the error, which is typically a code or short phrase. However, since multiple branches from the main program invoke the same service, it would be impossible to determine through which path the error message was returned.

The present invention solves this problem by keeping track of the path through which an error message is "rolled up" (queued) to a top level, namely the main program. The error message, as will be developed hereinafter, not only develops information concerning the path through which the function error is returned, but also indicates which line of source code was being operated upon by the main program during the generation of the error. Such a reporting system is of great advantage during operation of the system, so that it may be determined whether a user is introducing the error, or whether a software problem exists. Usefulness in detecting the latter mentioned problem is of particular importance during the debugging of applications during development.

In order to accomplish the objectives of the present invention, an application must be written (or an existing application rewritten) in a programming language that provides a tool kit sufficiently extensive to allow the types of error message generation presently required. Thus, in a preferred embodiment of the present invention, the known programming language C++ is employed.

Figure 3:
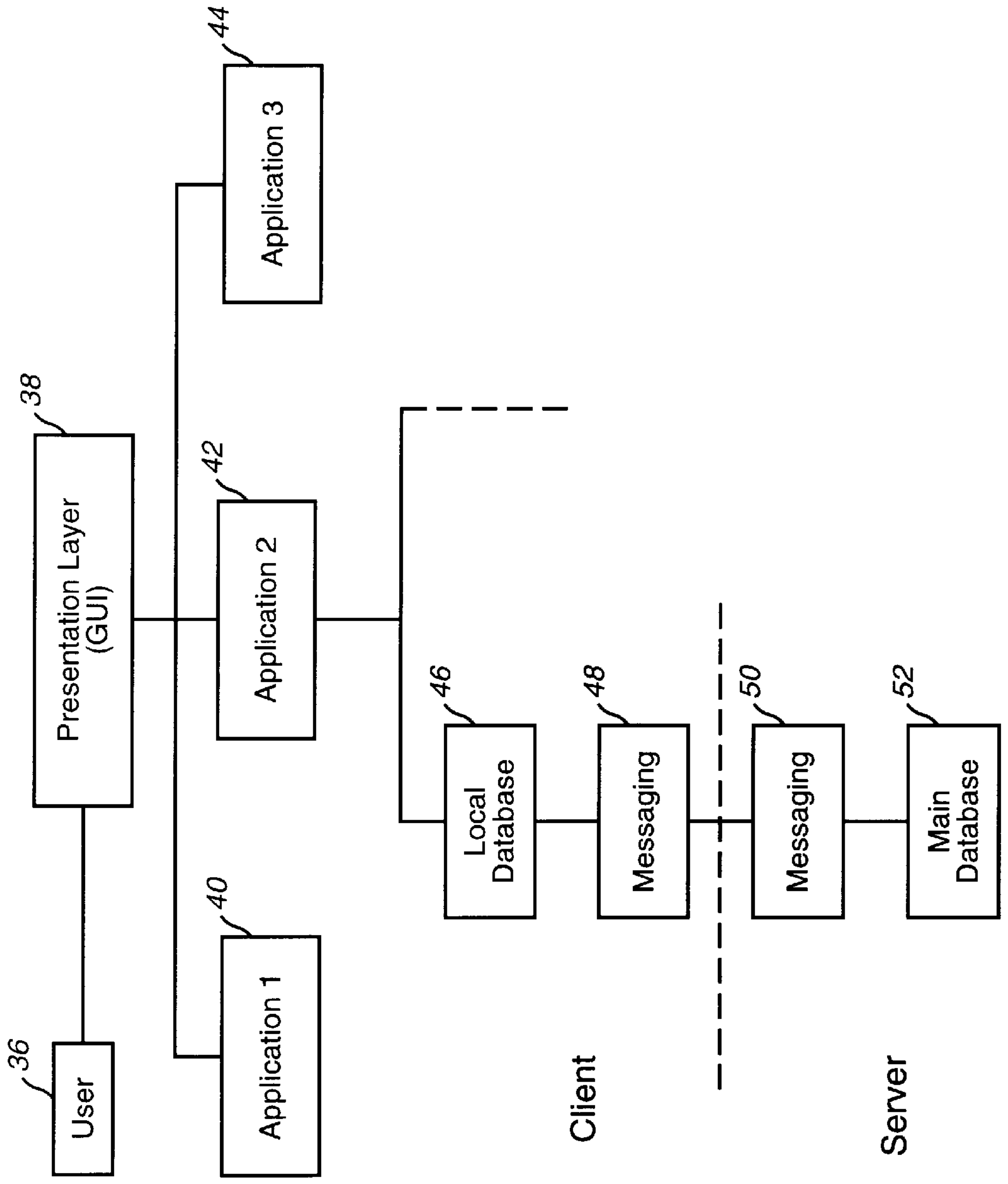
FIG. 3 is a basic block diagram of a client-server environment involving database management.

To further explore the usefulness of the present invention, reference is made to FIG. 3 which shows a typical client-server environment for database applications 40, 42 and 44. Typically, a user 36 monitors a display, which may be a graphical user interface (GUI) 38 (e.g., Windows™). This represents a data presentation layer for the user. The client is provided with a local database 46 which is constantly refreshed during system operation. Communication between the client and server occurs at a communication interface including a messaging layer 48 at the client and a corresponding messaging layer 50 at the server. The main database 52 at the server is the source of the complete database. In typical applications, messaging may occur by utilizing TCP/IP protocol.

In the system of FIG. 3, the user requests records from the main database 52. During such an operation, if an error message were created, the local database 46 would return a message indicating that the record could not be found. However, there would be no information as to which aspect of the communication chain actually caused the error. The programming language C++ includes exception handling capabilities (error messages) and by virtue of the present invention, the language's exception handling is augmented, in a manner heretofore unknown, so as to add error path tracking. Thus, in the example discussed in connection with FIG. 3, the presentation layer 38 would enable the user to specifically track where in the communication chain the error occurred, and which application was involved, including source code line identification.

Figure 8:
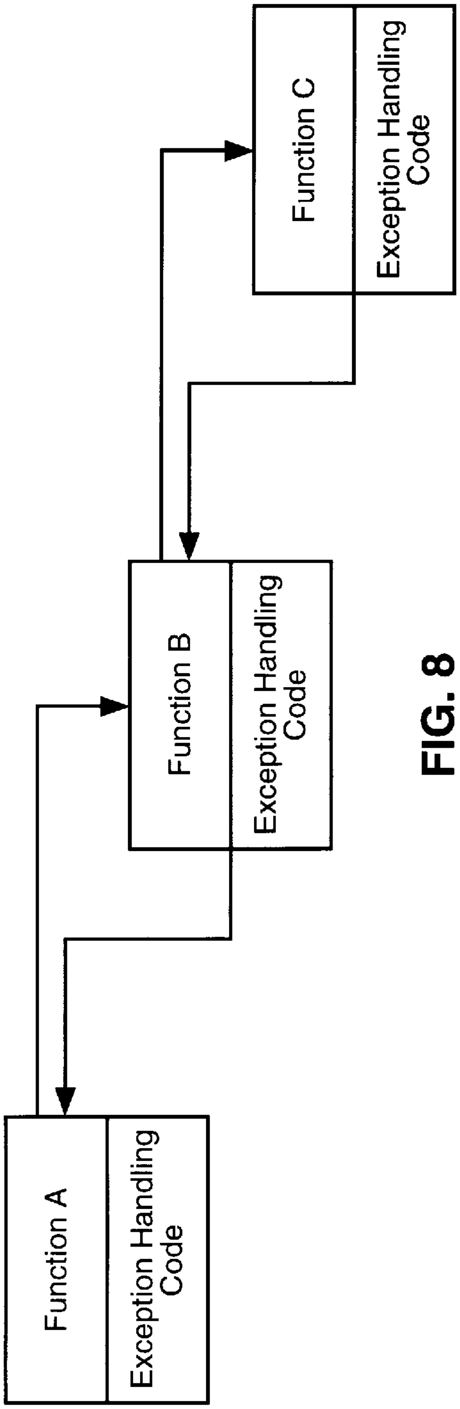
FIG. 8 is a flowchart of a sequence of normal operation of a program written in a language such as C++.

FIG. 8 represents the normal flow of control from function to function in a program written in C++, when there are no errors. In the Figure, Function A calls Function B. This results in a transfer of control to the beginning of Function B. At some time in its processing, Function B calls Function C, resulting in a transfer of control to the beginning of Function C. Function C calls no additional function and executes from beginning to end. When Function C has completed execution, control is transferred back to Function B, which continues executing, starting at the instruction following the call to Function C. Function B then completes executing and returns control back to Function A. Function A resumes execution starting at the instruction following the call to Function B. Function A then completes executing and returns control to its caller (which could possibly be the operating system if Function A is the "main" or topmost function in the application). Even though each function has "exception handling code", the code is never invoked since no error occurred.

Figure 9:
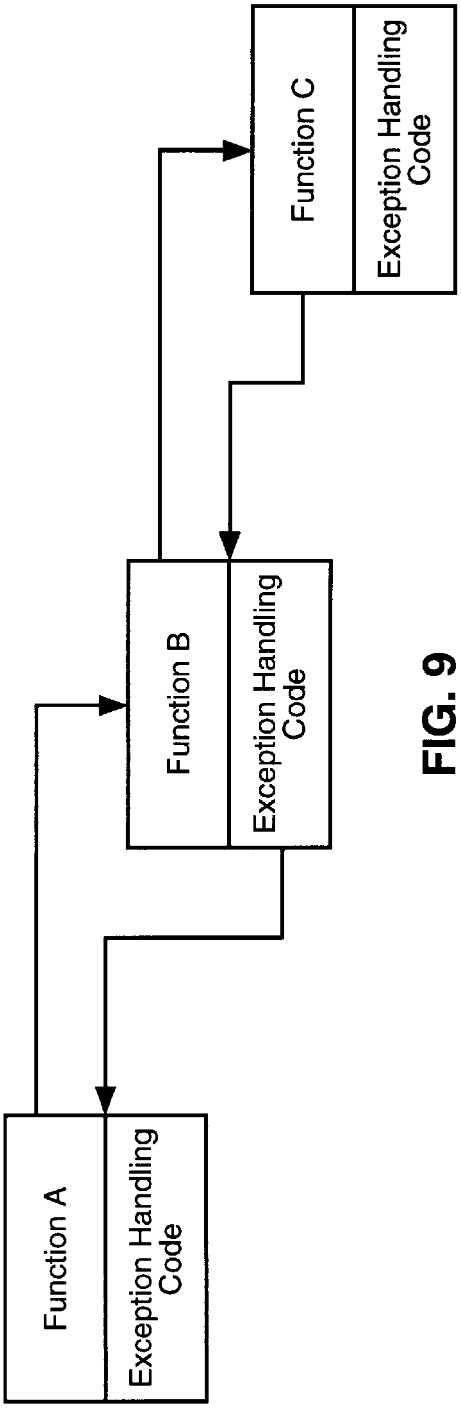
FIG. 9 is a flowchart similar to FIG. 8, with operation of error handling depicted.

FIG. 9 represents the same application as the previous FIG. 8, except that, in this case, Function C detects an error during its processing. When Function C "throws" an exception, control transfers to Function B. In this case, however, instead of execution resuming in Function B at the instruction following the call to Function C, execution now transfers to the exception handling code that is part of Function B. If this code passes the exception back up the chain ("rethrows" the exception), then control transfers to the exception handling code that is part of Function A.

Thus it is seen that, typically, function execution does not occur sequentially in the sense that Function A completes processing followed by Function B, followed by Function C. Instead, Function A interrupts itself to call Function B, which in turn interrupts itself to call Function C. When the lowest called function is complete, the next lowest function is then re-entered and allowed to complete. And so it goes, up and down the chain of function calls.

Figure 4:
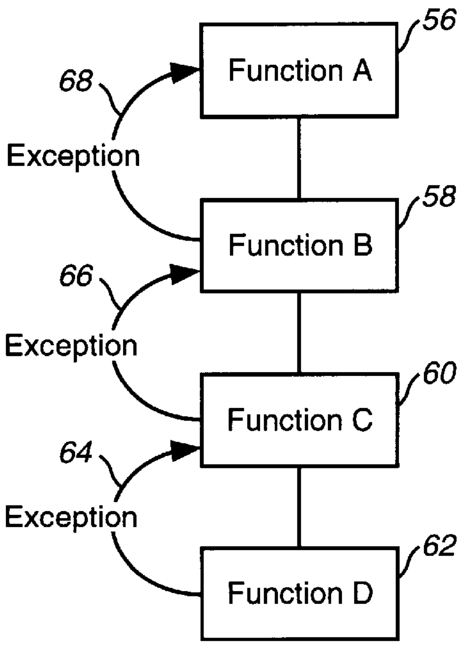
FIG. 4 is a flowchart indicating a typical prior art exception (error) handling process between functions of an application.

A further exploration of normal exception handling by C++ is indicated in FIG. 4, which does not include the augmentation of the present invention. In FIG. 4, a portion of an application is indicated, employing C++, wherein four sequential Functions A–D (56–62) are shown. For example, if an exception 64 was "thrown" (reported) by Function D, that exception is "caught" (received) by the previous layer C. As indicated in FIG. 4, the exception is "rolled up" through prior Functions (A–C) (66, 68), thereby completing an error reporting process. However, although the nature of the error may be identified, its particular path from Function D–A will not be derived.

Figure 5:
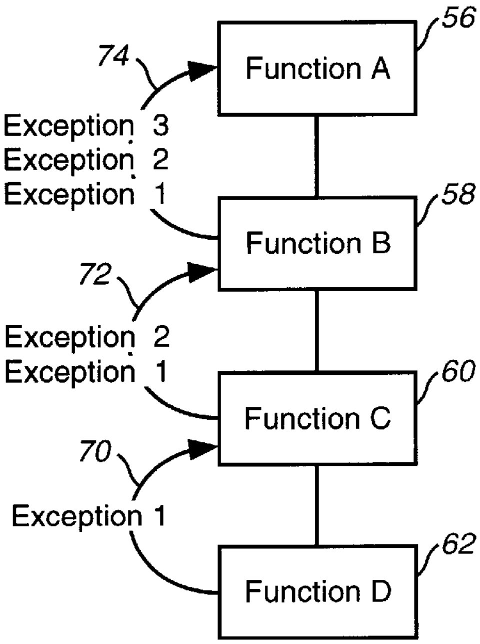
FIG. 5 is a flowchart, similar to FIG. 4, but indicating a hierarchical exception handling, as employed in the present invention.

FIG. 5 indicates the stacking of exceptions so that the entire return path of an exception may be recorded. In accordance with the present invention, if Function D throws Exception 1 (at reference numeral 70), a message will be generated indicating that Function D is found to be in error and what line of source code was effected. This message corresponds to Exception 1 (reference numeral 70). The thrown Exception 1 is caught by Function C which generates its own message acknowledging the previous message. Thus, Exception 2, thrown by Function C (72), repeats the information that Function D was found to be in error and that Function D was called from Function C. Further, the line of source code, where the error occurred, is repeated.

Reference numeral 74 in FIG. 5 indicates the continued rolling up of Exceptions 1 and 2 to the preceding Function B. Again, the error messages are stacked, with the Function B adding its own error message to repeat the previous information and adding the information that Function B called Function C.

Figure 6:
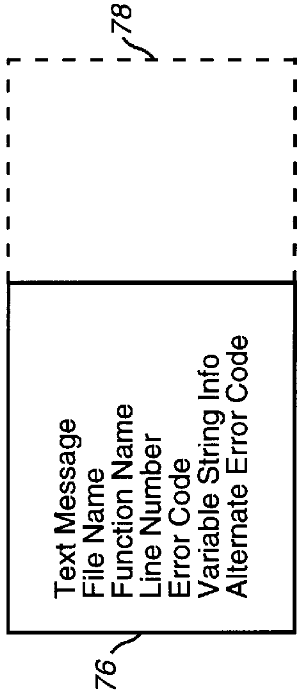
FIG. 6 is a layout of an exception message, indicating typical fields to be populated with detailed error message information, as employed in the present invention.

FIG. 6 indicates the stacking of two exception (error) messages 76 and 78. Block 76 indicates the typical types of fields that would be included in an exception generated by C++. These would typically include a text message, corresponding to the error. The file name indicates the original source file containing the function generated error. The function or function module name is next included. The line number in the original source code is similarly listed. If an error code is generated from the application itself, for example error codes in a word processing or database program, the error code would be included, as well. A field is also available for explanatory information relative to the error (variable string information). Another field may include an alternate error code, which, for example, may be a programmer's own error code.

Figure 7:
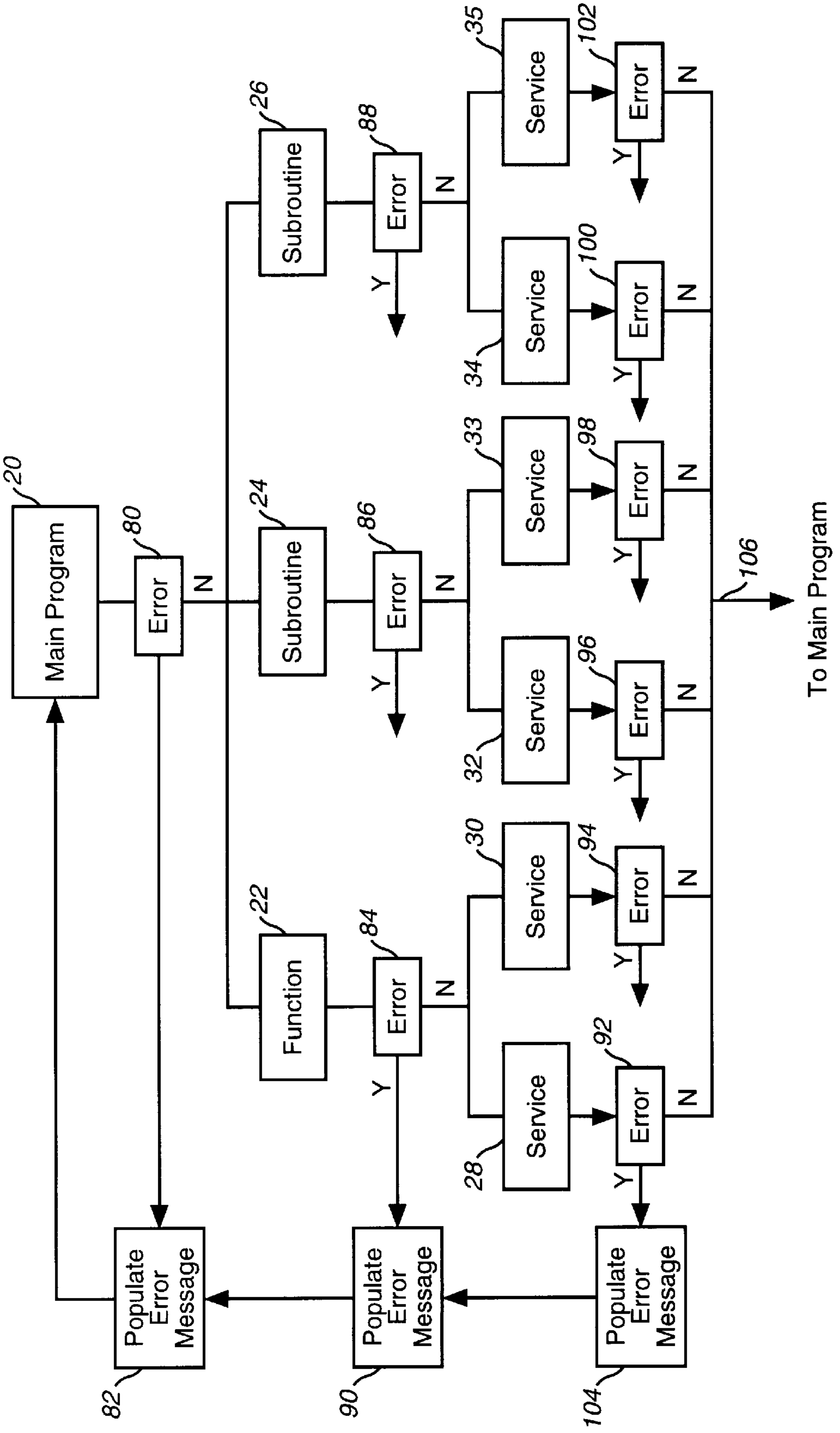
FIG. 7 is flowchart, similar to that of FIG. 2 but indicating additional hierarchical error reporting, as contributed by the present invention.

In operation of the present invention, FIG. 7 indicates a software flow diagram with enhanced error reporting, as compared with the prior art of FIG. 2.

Thus, as shown in FIG. 7, if an error is detected at step 80, between the main program 20 and the function/subroutine steps 22, 24, 26 an exception is generated and an error message 82 is populated, with the information indicated in FIG. 6.

If no error occurs, the application continues with the appropriate function or subroutine. If an error is detected during function 22, the error step 84 will populate an error message 90, and this is rolled up toward the main program by stacking a second error message 82 for completing the roll up path information. Similarly, if errors occur during subroutines 24 and 26, corresponding error steps 86 and 88 will populate an error message 90. In the example illustrated in FIG. 7, if no error messages occur at the conclusion of the function or subroutines, various services 28–35 will occur.

An error during the first executed service will cause completion of a corresponding error step 92–102, thereby causing the population of an error message 104 at this level. As indicated in FIG. 7, an error message 104 will be stacked with error messages 90 and 82 during roll up of the error message to the main program 20. If no error occurs, the application may be returned to the main program 106. The end result of error reporting is the stacking of error messages to complete the information concerning return path and source code line number.

Therefore, by virtue of the present invention, software applications may be written (or rewritten) in a programming language such as C++ with enhanced error reporting as compared with the prior art. Full information concerning error path and source line identification expedites error detection and correction in software that is being developed or thereafter.

It should be understood that the invention is not limited to the exact details of construction shown and described herein for obvious modifications will occur to persons skilled in the art.

I claim:

1. In a data processing environment where processes are performed by various layers of the data processing environment for running at least one software application, a method of identifying an error and a path that said error traversed through the various layers, comprising the steps of:

generating an error message in the process layer where said error occurred, said error message including information identifying said error and the line of source code being executed when said error occurred;

generating an other error message in each of the process layers where said error traversed as said error is being routed for presentation; and stacking the generated error messages to provide a stacked message to thereby identify where said error first occurred and the path said error message has traversed.

2. The method of claim 1, further comprising the steps of:

populating said error message with information identifying said error and the line of source code being executed when said error occurred;

populating said other error message of each of said process layers where said error has traversed with preselected path information; and wherein said stacking step further comprises the step of stacking said other error message to said error message and any preceding other error messages.

3. The method of claim 1, further comprising the step of:

displaying information from said stacked message to a user to thereby define the path said error has traversed through the various process layers and the line of source code executed when said error occurred.

4. The method of claim 1 further including client-server communication steps comprising:

accessing a client local database;

messaging data requests by the client to the server; and downloading the data requested during said application from a server based main database, via return messaging, to said client local database.

5. A data processing environment where processes are performed by various layers of the data processing environment for running at least one software application, compromising:

process means for generating an error message representative of an error having occurred at a given process layer, said error message including information identifying said error and the line of source code being executed when said error occurred, said process means generating an other error message in each of the process layers where said error traversed as said error is being routed for presentation, said process means further stacking the generated error messages to provide a stacked message identifying where said error first occurred and a path said error message has traversed; and display means for presenting said stacked message to a user to thereby enable said user to readily identify said error and the line of source code executed when said error occurred, and the path that said error traversed through the various layers.

6. The environment of claim 5, wherein said processing means further populates said error message with information identifying said error and the line of source code being executed when said error occurred and said other error message of each of said process layers where said error has traversed with preselected path information, and stacks said other error message to said error message and any preceding other error messages.

7. The environment of claim 5 further comprising:

a client local database accessible by a client;

a server to which data requests can be sent by the client;

wherein the data requested during said application can be downloaded from a server based main database, via return messaging, to said client local database.

* * * * *